United States Patent
Long et al.

(10) Patent No.: US 8,790,612 B2
(45) Date of Patent: Jul. 29, 2014

(54) CATION DEFICIENT MATERIALS FOR ELECTRICAL ENERGY STORAGE

(71) Applicants: Jeffrey W Long, Alexandria, VA (US); Debra R Rolison, Arlington, VA (US); Benjamin P. Hahn, Bethesda, MD (US)

(72) Inventors: Jeffrey W Long, Alexandria, VA (US); Debra R Rolison, Arlington, VA (US); Benjamin P. Hahn, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/760,151

(22) Filed: Feb. 6, 2013

(65) Prior Publication Data

US 2013/0149233 A1    Jun. 13, 2013

Related U.S. Application Data

(62) Division of application No. 12/855,114, filed on Aug. 12, 2010, now Pat. No. 8,388,867.

(60) Provisional application No. 61/233,948, filed on Aug. 14, 2009.

(51) Int. Cl.
    *H01M 4/48*    (2010.01)
    *H01M 4/485*   (2010.01)

(52) U.S. Cl.
    USPC ..................... 423/594.1; 423/593.1

(58) Field of Classification Search
    USPC ........................... 423/594.1, 593.1
    See application file for complete search history.

(56) References Cited

U.S. PATENT DOCUMENTS

| | | | |
|---|---|---|---|
| 7,585,474 B2 * | 9/2009 | Wong et al. | 423/1 |
| 7,585,593 B2 * | 9/2009 | Chang | 429/231.95 |
| 7,736,805 B2 * | 6/2010 | Nazri et al. | 429/218.2 |
| 8,062,560 B2 * | 11/2011 | Xi et al. | 252/519.1 |
| 2003/0180616 A1 * | 9/2003 | Johnson et al. | 429/231.1 |

OTHER PUBLICATIONS

Bouet et al., "Mixed valence states of iron and molybdenum ions in MoxFe3-x04 magnetites and related cation deficient ferrites" Solid State Ionics, 52,285-286 (1992).*
Gillot et al., "Reactivity of the submicron molybdenum ferrites towards oxygen and formalion of new cation deficient spinels" Solid State Ionics, 63-65, 620-627 (1993).*
Gillot et al., "New Cation-Deficienl Vanadium-Iron Spinels with a High Vacancy Content" Malerials Research Bulletin, 34, 1735-1747 (1999).*
Kanzaki et al., "Nano-sized y-Fe2O3 as lithium battery cathode" Journal of Power Sources, 146, 323-326 (2005).*

(Continued)

*Primary Examiner* — Peter D. Mulcahy
*Assistant Examiner* — Henry Hu
(74) *Attorney, Agent, or Firm* — US Naval Research Laboratory; Joseph T. Grunkemeyer

(57) ABSTRACT

A composition comprising: a metal oxide of a first metal ions and second metal ions; an electrically conductive material; and a binder material. The second metal ions have a higher oxidation state than the first metal ions. The presence of the second metal ion increases the number of metal cation vacancies. A method of: dissolving salts of a first metal ion and a second metal ion in water to form a solution; heating the solution to a temperature of about 80-90° C.; and adding a base to the solution to precipitate nanoparticles of a metal oxide of the first metal ion and the second metal ion.

3 Claims, 8 Drawing Sheets

(56) References Cited

OTHER PUBLICATIONS

Roy et al., "Studies on Some Titanium-Substituted Fe2MoO4 Spinel Oxides" J. Solid State Chem., 140, 56-61 (1998).*

Kwon et al., "Inorganic Nanocrystalline and Hybrid Nanocrystalline Particles (Gamma-Fe2O3/PPY) and Their Contribution to Electrode Materials for Lithium Batteries" Journal of The Electrochemical Society, 151(9), A1445-A1449 (2004).*

* cited by examiner

CATION DEFICIENT MATERIALS FOR ELECTRICAL ENERGY STORAGE

This application is a divisional application of U.S. patent application Ser. No. 12/855,114, now U.S. Pat. No. 8,388,867, which claims the benefit of U.S. Provisional Application No. 61/233,948, filed on Aug. 14, 2009. The provisional application and all other publications and patent documents referred to throughout this nonprovisional application are incorporated herein by reference.

TECHNICAL FIELD

The present disclosure is generally related to materials for lithium-ion batteries.

DESCRIPTION OF RELATED ART

The demand for lithium-ion batteries has increased rapidly over the past two decades, and as technology continues to advance, manufacturers will want to develop low-cost, non-toxic cathode materials with exceptional charge-storage properties. Iron oxides are naturally abundant and environmentally safe, but the reported $Li^+$ capacities are often lower than metal oxides used in commercial electrode materials, such as $LiCoO_2$ (Manthiram et al., *Chem. Mater.* 10, 2895-2909 (1998)). Additionally, the insertion potential for $Li^+$ is limited by the $Fe^{2+/3+}$ redox couple, and as a result, many iron oxides insert $Li^+$ at potentials so low (usually <2 V vs Li) (Reddy et al., *Adv. Funct. Mater.* 17, 2792-2799 (2007); Liu et al., *Electrochim. Acta* 54, 1733-1736 (2009); Abraham et al., *J. Electrochem. Soc.* 137, 743-749 (1990); Prosini et al., *Int. J. Inorg. Mater.* 2, 365-370 (2000); Lipparoni et al., *Ionics* 8, 177-182 (2002)), they are not practical as cathode materials for lithium-ion batteries.

Despite these limitations, the electrochemical properties of iron oxide can be significantly enhanced by tailoring the particle size and structure of the active material. For example, reducing the particle size increases the electrochemically active surface area per structural unit and allows iron oxide to be more accessible to the electrolyte. As a result, the average distance electrons and charge-compensating cations must travel to reach the intercalation host is reduced and higher $Li^+$ storage capacities can be achieved (Bazito et al., *J. Braz. Chem. Soc.* 17, 627-642 (2006); Aricò et al., *Nature Mater.* 4, 366-377 (2005)). This principle has been experimentally demonstrated with hematite, $\alpha$-$Fe_2O_3$, where large capacities of 250 mAh $g^{-1}$ were attained when the particle size was reduced to ~5 nm (Jain et al., *Chem. Mater.* 18, 423-434 (2006)). Other advantages realized by expressing iron oxide at the nanoscale include faster rate capabilities and greater long-term stability during electrochemical cycling (Hibino et al., *J. Electrochem. Soc.* 154, A1107-A1111 (2007)), because smaller particles can more easily accommodate the strain induced during charge storage.

The oxide structure is also related to the mechanism for solid-state insertion of small cations and the accompanying phase transformations that occur during electrochemical cycling, which determine how much $Li^+$ can be reversibly stored in the host material. For example, the spinel ferrite magnetite, $Fe_3O_4$, cannot structurally accommodate reversible charge storage, because the injection of $Li^+$ into the lattice irreversibly displaces tetrahedrally coordinated $Fe^{3+}$ into octahedral sites (Thackeray et al., *Mat. Res. Bull.* 17, 785-793 (1982); Thackeray *J. Am. Ceram. Soc.* 82, 3347-3354 (1999)). Maghemite, $\gamma$-$Fe_2O_3$ or $Fe[Fe_{5/3}\cdot\square_{1/3}]O_4$, is an isostructural analog of magnetite containing cation vacancies ($\square$) in the octahedral $Fe^{2+}$ positions. These vacancies increase the $Li^+$ storage capacity and shift the electromotive force (EMF) of electrochemical charge storage to more positive potentials (Pernet et al., *Solid State Ionics* 66, 259-265 (1993)). Similar observations correlating the cation vacancy content of an oxide with enhancements to the classical small cation insertion mechanism have been made using defect $MnO_2$ phases (Ruetschi, *J. Electrochem. Soc.* 135 2657-2663 (1988); Ruetschi et al., *J. Electrochem. Soc.* 135, 2663-2669 (1988)) and microcrystalline $V_2O_5$ (Swider-Lyons et al., *Solid State Ionics* 152-153, 99-104 (2002)).

Gillot and coworkers demonstrated that substituted spinel ferrites containing highly oxidized cations (e.g., $Mo^{6+}$, $V^{5+}$) can be prepared using a chimie douce approach (Gillot et al., *Solid State Ionics* 101-103, 261-264 (1997); Gillot et al., *Heterogen. Chem. Rev.* 1, 69-98 (1994)). The resultant solids are cation-deficient with a vacancy population up to 2-3 times that of $\gamma$-$Fe_2O_3$ (Gillot et al., *Mat. Res. Bull.* 34, 1735-1747 (1999); Gillot et al., *Solid State Ionics* 52, 285-286 (1993)).

BRIEF SUMMARY

Disclosed herein is a composition comprising: a metal oxide comprising ions of a first metal and ions of a second metal; an electrically conductive material; and a binder material. The second metal ions have a higher oxidation state than the first metal ions. The presence of the second metal ion increases the number of metal cation vacancies.

Also disclosed herein is a composition comprising a metal oxide comprising ions of a first metal and ions of a second metal. The second metal ions have a higher oxidation state than the first metal ions. The presence of the second metal ion increases the number of metal cation vacancies. The metal oxide is proton stabilized.

Also disclosed herein is a method comprising: dissolving salts of a first metal ion and a second metal ion in water to form a solution; heating the solution to a temperature of about 80-90° C.; and adding a base to the solution to precipitate nanoparticles of a metal oxide of the first metal ion and the second metal ion. The second metal ions have a higher oxidation state than the first metal ions. The presence of the second metal ion increases the number of metal cation vacancies.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
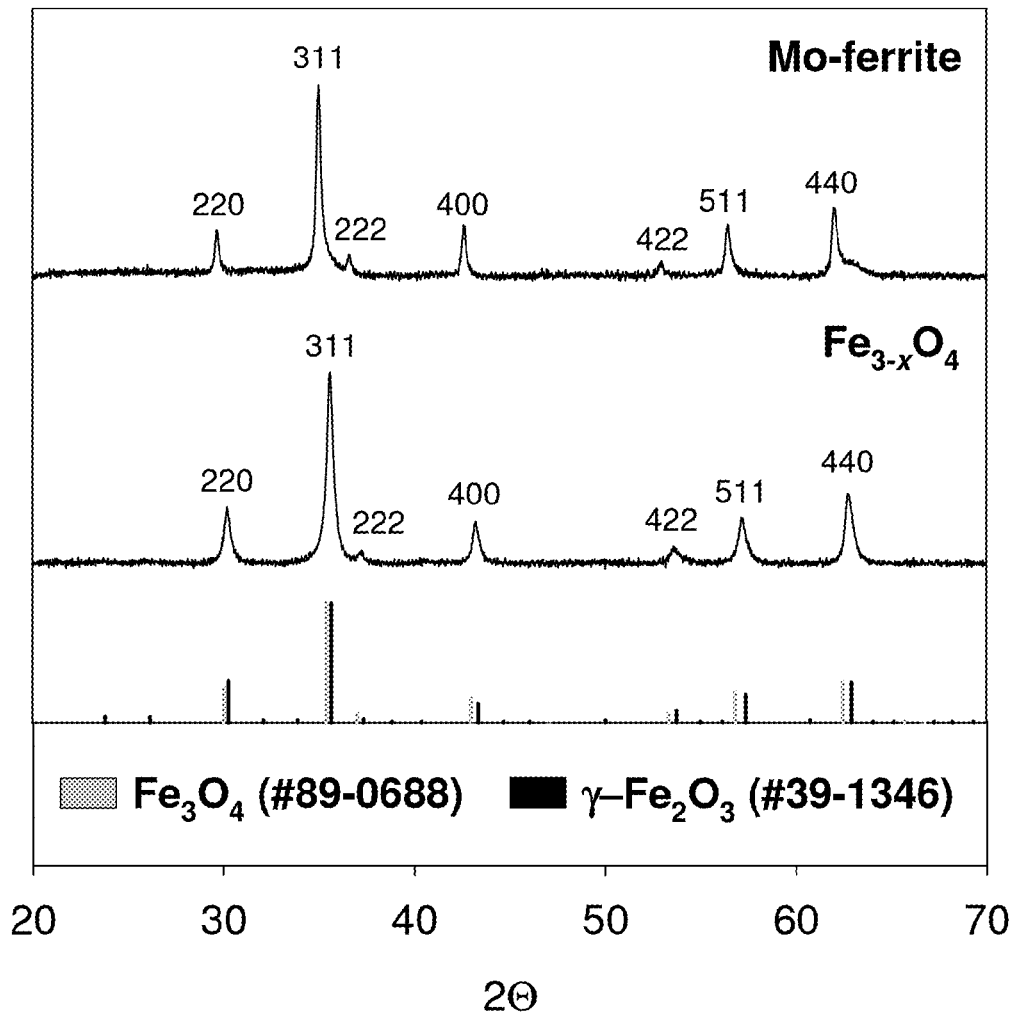
FIG. 1 shows XRD patterns of "as-prepared" Mo-ferrite and $Fe_{3-x}O_4$ depicted against known diffraction patterns of $Fe_3O_4$ (PDF #89-0688) and $\gamma$-$Fe_2O_3$ (PDF #39-1346).

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are defect iron oxides, such as nanocrystalline γ-$Fe_2O_3$, modified to serve as enhanced cathode materials for lithium-ion batteries. Given that there is a strong relationship between vacancy content and energy-storage capabilities, optimized Mo- and V-substituted iron oxide spinels may achieve reversible Li$^+$ capacities in excess of 100 mAh g$^{-1}$ at a discharge potential of 2 V vs Li. Moreover, the inclusion of Mo$^{6+}$ and V$^{5+}$ as substituent cations is anticipated to shift the EMF of Li$^+$ insertion to approximately 2.7 V and 3.4 V vs Li respectively, consistent with previous charge-storage studies involving the Mo$^{6+/5+}$ and the V$^{5+/4+}$ redox couples (Ohtsuka et al., *Solid State Ionics* 144, 59-64 (2001); Guzman et al., *Solid State Ionics*, 86-88, 407-413 (1996); Vivier et al., *Electrochim. Acta* 44, 831-839 (1998)).

γ-$Fe_2O_3$ is a potentially better cathode material than $Fe_3O_4$, because the oxide structure has $Fe^{2+}$ vacancies that insert Li$^+$ prior to structural transformations (Pernet et al., *Solid State Ionics* 66, 259-265 (1993)). As an extension of this concept, more highly cation-deficient spinels should perform as better Li$^+$ intercalation hosts than γ-$Fe_2O_3$. In cases where the defect spinel is a binary oxide, such as $Mo_aFe_bO_4$ and $V_aFe_bO_4$, the choice of substituent may enhance the charge-storage mechanism further by raising the Li$^+$ insertion potential. The material may also be a magnesium insertion material. Herein is described the synthesis and characterization of the substituted spinel ferrite, $Mo^{6+}_{0.59}Fe^{3+}_{1.45}Fe^{2+}_{0.06}\square_{0.90}O_4 \cdot nH_2O$ (hereby designated as Mo-ferrite), and the electrochemical charge-storage mechanism with respect to the parent oxide, $Fe^{3+}_{2.36}Fe^{2+}_{0.46}\square_{0.18}O_4 \cdot nH_2O$ (hereby designated as $Fe_{3-x}O_4$), where $\square$ represents the vacancy content.

γ-$Fe_2O_3$ and other oxides may be improved as an intercalation host by increasing the number of cation vacancies within the defect spinel framework. Published studies by Gillot and coworkers proposed (Gillot et al., *Heterogen. Chem. Rev.*, 1, 69-98 (1994); Nivoix et al., *Chem. Mater.*, 12, 2971-2976 (2000)) and then demonstrated (Gillot, *Vib. Spectrosc.*, 6, 127-148 (1994); Domenichini et al., *Thermochim. Acta*, 205, 259-269 (1992); Gillot et al., *Mat. Res. Bull.*, 34, 1735-1747 (1999)) that a fraction of the $Fe^{3+}$ sites within $Fe_3O_4$ can be replaced with more highly oxidizable cations, such as Mo$^{3+}$ or V$^{3+}$, while preserving the inverse spinel structure. When these transition metal cations undergo multi-electron oxidation processes during sintering, defect spinels form with the Mo- and V-substituted ferrites achieving over twice as many vacancies per structural unit as γ-$Fe_2O_3$ (Table 1). This hypothesis has been tested experimentally. Considering these highly cation-deficient frameworks, it is predicted that $Mo_aFe_bO_4$ and $V_aFe_bO_4$ spinels are better Li$^+$ intercalation hosts than γ-$Fe_2O_3$. Not only are these binary metal oxides structurally designed to accommodate higher Li$^+$ storage capacities, but in addition, the inclusion of Mo$^{6+}$ and V$^{5+}$ as dopants is anticipated to shift the EMF of Li$^+$ intercalation to more positive potentials. The pure oxides Mo$^{6+}O_3$ and V$^{5+}_2O_5$ begin to insert Li$^+$ around 2.7 V and 3.4 V, vs Li respectively (Ohtsuka et al., *Solid State Ionics*, 144, 59-64 (2001); Guzman et al., *Solid State Ionics*, 86-88, 407-413 (1996); Vivier et al., *Electrochim. Acta*, 44, 831-839 (1998)), and it is expected that any multi-electron reductions that occur during discharge (e.g., Mo$^{6+}$→Mo$^{5+}$→Mo$^{4+}$) will support the enhanced Li$^+$ capacities that result from high vacancy concentrations. Other example second metals include, but are not limited to, Nb, Ta, Ti, W, and Zr. The first metal and the second metal may be different and they may both be other than Li.

TABLE 1

Theoretical vacancy concentrations of Mo— and V— substituted spinel ferrites

| Defect Spinel[a] | Vacancies per Formula Unit | # of Cation Vacant Sites[b] |
|---|---|---|
| $Fe^{3+}_{8/3} \bullet \square_{1/3} O_4$ | 0.33 | 2.67 |
| $Mo^{6+}_{2/3} \bullet Fe^{3+}_{4/3} \bullet \square_{3/3} O_4$ | 1.00 | 8.00 |
| $V^{5+}_{8/11} \bullet Fe^{3+}_{16/11} \bullet \square_{9/11} O_4$ | 0.82 | 6.63 |

[a]Formulas are described in $AB_2O_4$ stoichiometry.
[b]Number of vacancies per unit cell. Assumes 24 cation sites possible.

At low temperatures (~250-400° C.) $Fe_3O_4$ undergoes a topotactic rearrangement to form maghemite γ-$Fe_2O_3$ (Cornell et al., *The Iron Oxides: Structure, Properties, Reactions, Occurrence, and Uses*. VCH: Weinheim, 1996; Zboril et al., *Chem. Mater.*, 14, 969-982 (2002)), a cation-deficient analogue that is more electrochemically stable at positive potentials. Structurally magnetite and maghemite are almost identical, except maghemite has vacancies in the octahedral $Fe^{2+}$ positions. (Although this is generally true, it is possible to prepare highly disordered γ-$Fe_2O_3$ phases containing both tetrahedral and octahedral vacancies. For further discussion, see Humihiko et al., *J. Phys. Soc. Jpn.*, 21, 1255-1263 (1966).) Pernet and coworkers (Pernet et al., *Solid State Ionics*, 66, 259-265 (1993)) suggest that these vacant sites electrochemically intercalate Li$^+$ prior to major structural transformations, resulting in a more positive EMF for Li$^+$ insertion and higher charge storage capacities. Furthermore, when prepared in nanocrystalline form, γ-$Fe_2O_3$ has been shown to insert/extract Li$^+$ at Coulombic efficiencies up to 98% with little capacity fading after the fifth charge-discharge cycle (Quintin et al., *Electrochim. Acta*, 51, 6426-6434 (1993)).

Using a chimie douce approach, Mo-ferrite or other substituted defect spinel ferrites may be prepared through a base-catalyzed precipitation reaction. In our studies, the material composition was established through X-ray photoelectron spectroscopy (XPS), energy dispersive X-ray (EDX) spectroscopy, X-ray absorption spectroscopy (data not shown), and thermogravimetry/mass spectrometry (TG-MS). Structural and morphological properties were established using X-ray diffraction (XRD) and transmission electron microscopy (TEM). Finally, the electrochemical charge storage mechanism was examined through cyclic voltammetry and galvanostatic charge-discharge experiments in a conventional three-electrode half-cell configuration.

Substitutionally doping $Mo^{6+}$ for $Fe^{3+}$ in $\gamma$-$Fe_2O_3$ is proposed to increase the relative population of cation vacancies within the lattice. For every cation vacancy created, charge neutrality must be maintained by either losing a proportional amount of anion charge or accepting other positively charged species (e.g., $H^+$, $Mo^{6+}$).

The extent to which water (or protons) participate to stabilize cation-deficient lattice structures is not well understood, but the local coordination geometry and the mechanism of defect formation are both strongly influenced by the synthetic pathway. Considering that our ferrite synthesis is an aqueous chimie douce route, coordinated water is likely incorporated into our material composition during the formation of transition metal cation vacancies. Theoretical models addressing this type of defect lattice structure have been described for cation-deficient phases of $MnO_2$, where four protons are proposed to occupy each vacant $Mn^{4+}$ site to preserve charge neutrality (Ruetschi et al., *Electrochem. Soc.*, 135, 2663-2669 (1988)). The existence of these protons is justified experimentally by thermogravimetric studies. For example, when cation-deficient $MnO_2$ is heated up to 400° C., the vacancies and charge compensating protons become mobile; as vacancies are removed, the trapped protons are released to react with $O^{2-}$ and form water (Ruetschi et al., *Electrochem. Soc.*, 135, 2663-2669 (1988)). If a similar charge-compensation mechanism applies to Mo-ferrite, water should be expelled from the sample at temperatures significantly beyond 100° C. The proton-stabilized form of our synthesized maghemite and Mo substituted forms may be expressed as $Fe_{2.36}^{3+}Fe_{0.46}^{2+}\square_{0.18}O_4 \cdot nH_2O$ and $Mo^{6+}_{0.59}Fe^{3+}_{1.45}Fe^{2+}_{0.06}\square_{0.90}O_4 \cdot nH_2O$, respectively. Any reference to an oxide throughout this application can include such a proton-stabilized form without specifically referencing the protons or hydrates.

Assuming the inclusion of protons/water within the defect ferrites is required to maintain structural stability, one can write down a hypothetical equilibrium between the hydrated, cation-deficient $\gamma$-3phase and the dehydrated, defect-free solid product(s) to solve for the water content (Eqs. 1, 2).

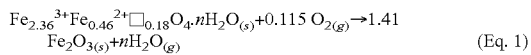

(Eq. 1)

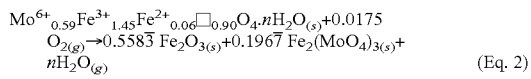

(Eq. 2)

The utilization of Mo- and V-substituted spinel ferrites as cathode materials in lithium-ion batteries may be highly economical compared to the cost of developing more traditional electrode materials (e.g., $LiCoO_2$). Iron-based compounds can be 60-160 times less expensive than many commercially developed metal oxides used for energy storage (Choi et al., *J. Power Sources* 163, 158-165 (2006)), so there is tremendous incentive to rethink/redesign intercalation hosts using iron. Prior to this work, iron oxides were less practical as cathode materials, because generally only small capacities could be achieved at a discharge potential limit of 2 V vs. Li. The mixed metal oxide nanoparticles reported herein can exhibit reversible $Li^+$ capacities several times higher than those observed in classical $\gamma$-$Fe_2O_3$ and express a more positive EMF for $Li^+$ intercalation. The combination of enhancements in both capacity and EMF in Mo- and V-substituted spinel ferrites is anticipated to increase the energy density of Li-ion batteries utilizing said cathode materials by an order of magnitude or more.

The following examples are given to illustrate specific applications. These specific examples are not intended to limit the scope of the disclosure in this application.

Example 1

Synthesis of $Fe_{3-x}O_4$ and Mo-Ferrite Nanoparticles

The synthesis for developing cation-deficient spinel ferrites was adapted from a chimie douce approach described by Gillot and coworkers (Gillot et al. *Solid State Ionics*, 52, 285-286 (1992); Gillot et al., *Solid State Ionics*, 63-65, 620-627 (1993)), but the literature suggests other aqueous (Livage, *J. Sol-Gel Sci. Technol.*, 1, 21-33 (1993); Herranz et al., *Chem. Mater.*, 18, 2364-2375 (2006)) and organic (Gash et al., *Chem. Mater.*, 13, 999-1007 (2001)) routes could be modified to prepare similar materials. For this study, Mo-ferrite nanoparticles were prepared by dissolving 20 mmol of $MoCl_5$ (Strem), $FeCl_3 \cdot 6H_2O$ (Aldrich), and $FeCl_2 \cdot 4H_2O$ (Aldrich) in 350 mL of nanopure water ("$nH_2O$"). ($MoCl_5$ is highly reactive in the presence of water and liberates toxic HCl gas. Take appropriate safety precautions.) While stirring, the temperature of the solution was raised to 80-90° C., and triethylamine (Aldrich) was added dropwise in a 10:1 organic-to-metal mole ratio. An opaque solid was soon visible, and after one hour of reacting in solution, the hot precipitate was collected onto paper by gravity filtration. The product was rinsed copiously with acetone (Warner Graham Company) and $nH_2O$ to remove residue left behind from the reactants. After drying in air, the oxide was lightly ground and heated in a drying oven at 85° C. for 24 hours to evaporate any remaining adsorbed solvent. The control, $Fe_{3-x}O_4$, was prepared in the same manner by excluding $MoCl_5$ from the synthesis.

Example 2

Physical Characterization

Structural analysis was conducted using a Bruker AXS D8 ADVANCE diffractometer equipped with a Cu K$\alpha$ source ($\lambda$=1.5406 Å). Sample powders were loaded into poly(methyl methacrylate) specimen holders and a single scan was conducted from 20°-70° on the 2-theta axis with a step increment of 0.02°. The integration time for each of the 2500 data points acquired was 10 s. The presented XRD patterns (FIG. 1) are background subtracted and stripped of the K$\alpha_2$ contribution. The XPS measurements of the Mo 3d spectral region were conducted on a Thermo Scientific K-Alpha spectrometer with a flood gun and a monochromatic Al K$\alpha$ source (1486.7 eV). High-resolution scans were acquired using a pass energy of 20 eV and a dwell time of 100 ms. The step size was fixed at 0.15 eV, and the spectra were signal averaged ten times before analysis. XPS data were fit with the 2009 version of Unifit (written by Ronald Hesse) using a Shirley background correction (Shirley, *Phys. Rev. B*, 5, 4709-4714 (1972)). Electron micrographs, electron diffraction (ED) patterns, and elemental energy dispersive X-ray (EDX) maps were all acquired on a JEOL 2200FS TEM equipped with a Gatan CCD camera and a NORAN System SIX X-ray Microanalysis System. For analysis, each metal oxide was brushed onto a holey-carbon film support 200-mesh copper grid (SPI Supplies) and multiple images/elemental maps were acquired to determine the representative compositional and morphological features presented herein. The water content was assessed by thermoanalytical measurements. Briefly, 10-15 mg of each metal oxide was placed in an $Al_2O_3$ crucible and heated in a NETZSCH STA 449 F1 Jupiter TGA interfaced to a QMS 403 Aëolos mass spectrometer. In each analysis the TG-MS was programmed to equilibrate at 50° C. for 10 min and then ramped to 600° C. at 10° min$^{-1}$ under a controlled stream of $O_2$ (30 mL min$^{-1}$). The mass spectrometer was used to detect the expulsion of singly charged water (m/z=18) throughout the experiment.

Figure 2:
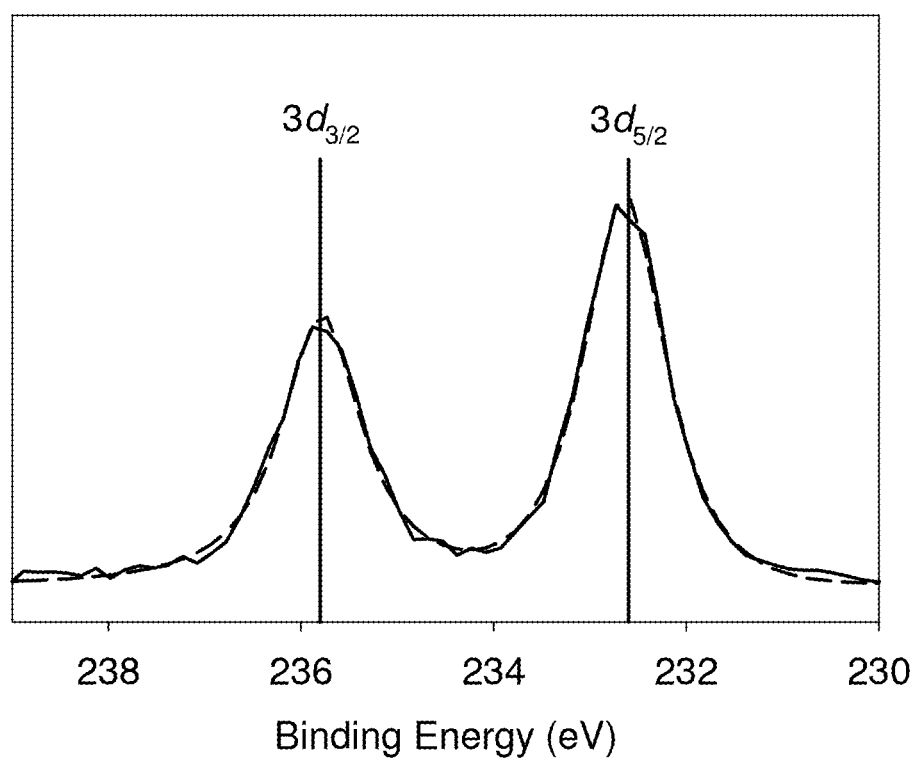
FIG. 2 shows high resolution XPS spectra of the Mo 3d region taken of Mo-ferrite. The background subtracted data (solid line) and fit (dashed line) are shown. $\chi^2_{red}$=1.446.
Figure 3:
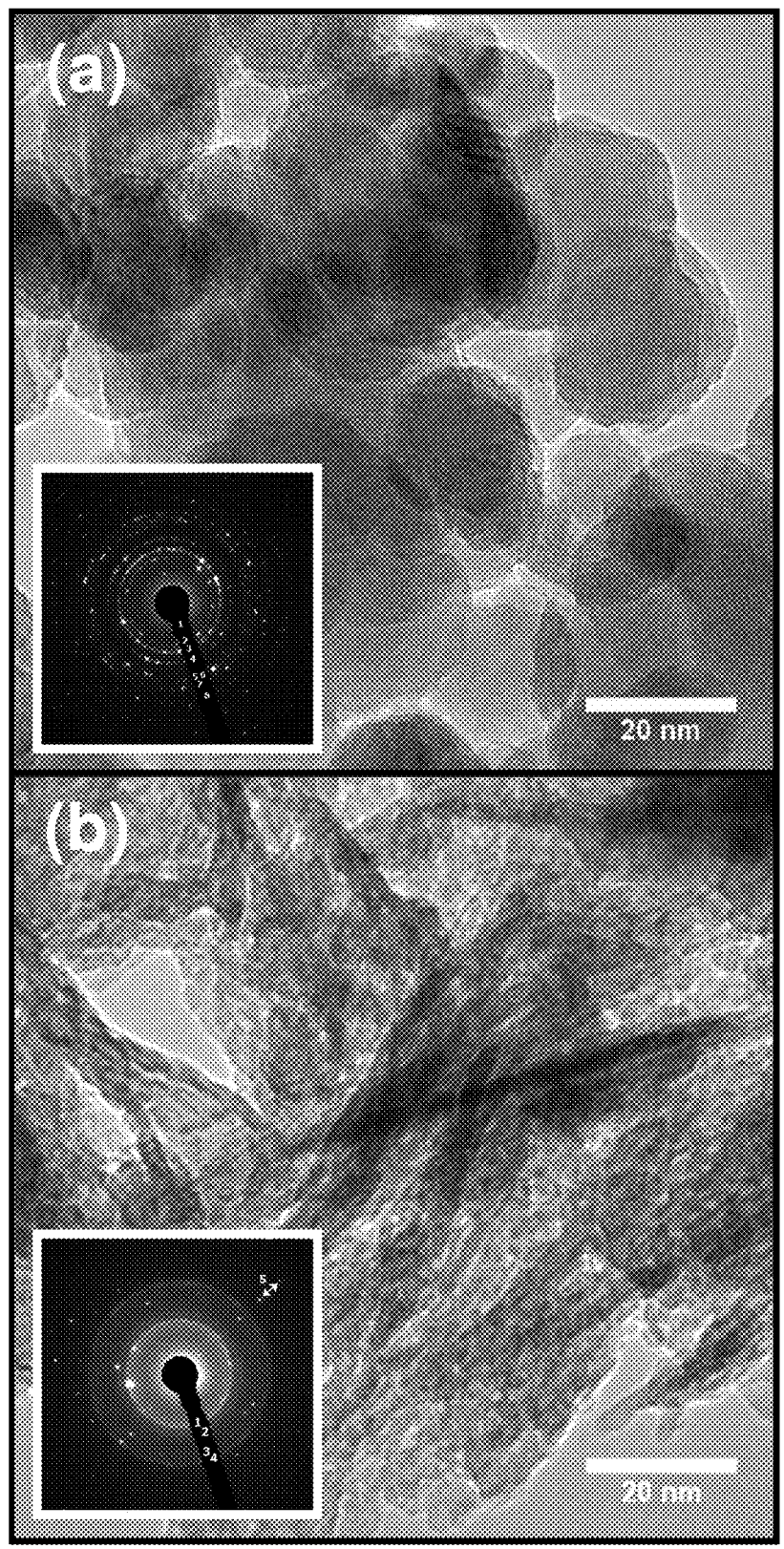
FIG. 3 shows representative TEM images of (a) $Fe_{3-x}O_4$ and (b) Mo-ferrite displayed with inset micrographs showing the corresponding electron diffraction patterns. The numeric labels identify the hkl indices.
Figure 4:
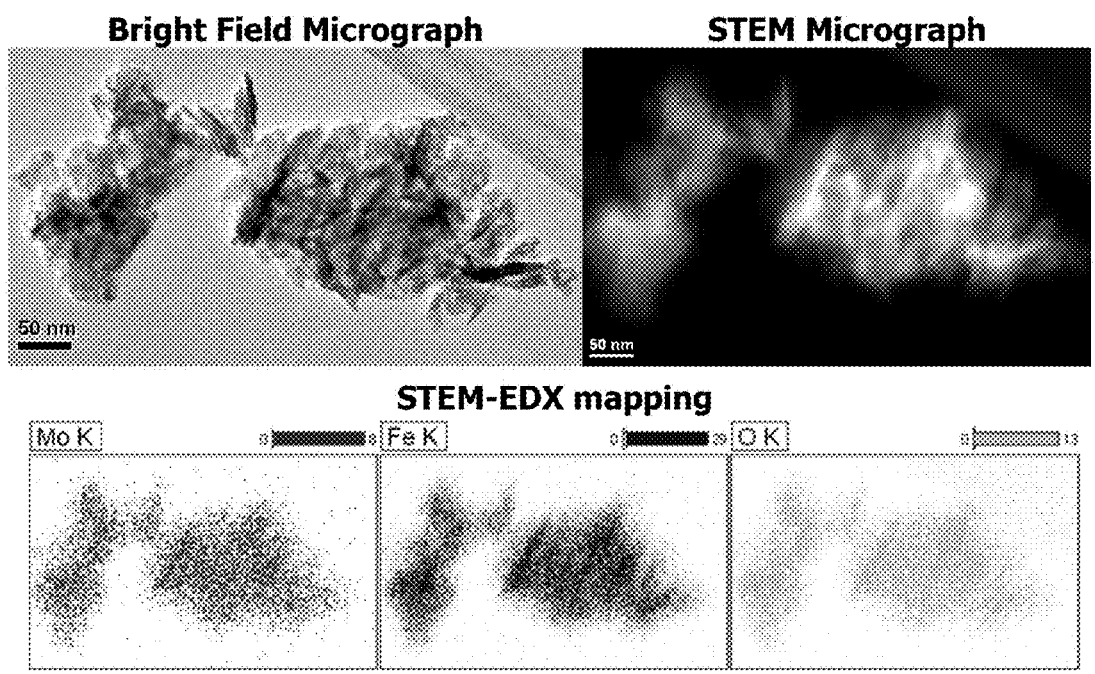
FIG. 4 shows bright field and scanning transmission electron microscopy (STEM) images of Mo-ferrite shown with EDX maps of the Mo, Fe, and O content.
Figure 5:
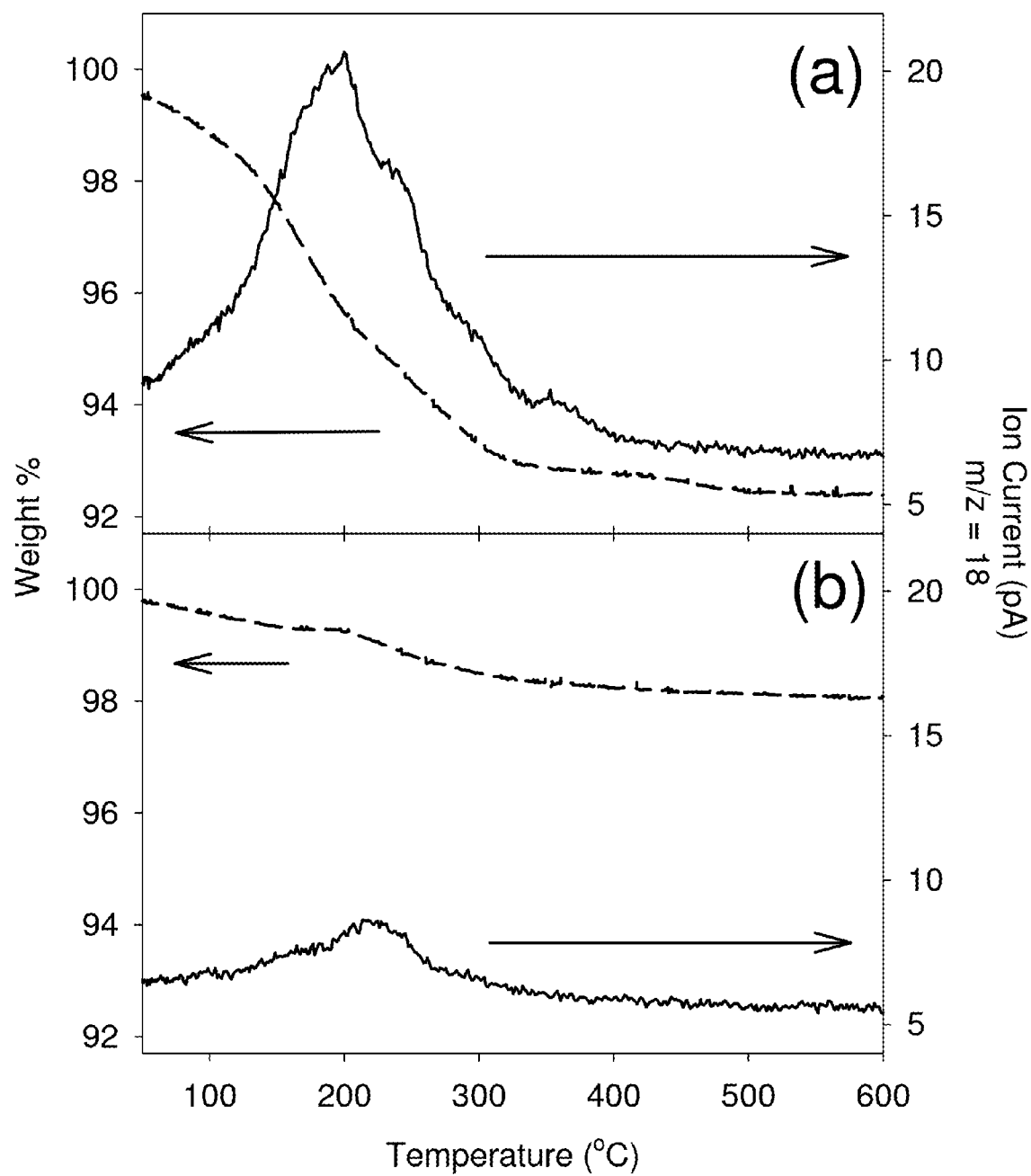
FIG. 5 shows TG-MS data of (a) Mo-ferrite and (b) $Fe_{3-x}O_4$ where the dashed line indicates the change in mass and the solid line indicates the ion current detected by the mass spectrometer at m/z=18.

In FIG. 1, the diffraction patterns of Mo-ferrite and the $Fe_{3-x}O_4$ control are shown; both correlate with the cubic $\gamma$-$Fe_2O_3$/$Fe_3O_4$ lattice structures (Schulz et al., ICDD Grant-in-Aid, North Dakota State University (1987) PDF#39-1346; Fjellvåg et al., *J. Solid State Chem.* 124, 52-57 (1996) PDF#89-0688). The XPS analysis of the Mo-ferrite composition (FIG. 2) confirms that our base-catalyzed synthesis yields a product containing Mo having a chemical state consistent with $Mo^{6+}$ in $MoO_3$ (Bica de Moraes et al., *Chem. Mater.* 16, 513-520 (2004); Patterson et al., *J. Phys. Chem.* 80, 1700-1708 (1976); Fleisch et al., *Appl. Surf. Sci.* 26, 488-497 (1986)). FIG. 3 shows TEM images of the Mo-ferrite and the $Fe_{3-x}O_4$ control samples, with nanoparticles and nano-sized morphological features clearly visible. The EDX mapping (FIG. 4) confirms that the Mo ferrite sample is compositionally uniform as synthesized with no elemental segregation between the varying morphological features. Thermal oxidation of Mo-ferrite and $Fe_{3-x}O_4$ in hybrid TG-MS experiments (FIG. 5) leads to mass loss during heating with water as the major constituent released.

The vacancy concentration of our defect spinel ferrites was approximated from the aforementioned datasets and results not presented here from X-ray absorption spectroscopy (XAS) experiments and quantitative energy dispersive X-ray (EDX) analysis. Based on the XRD data (FIG. 1), we assume that the Mo-ferrite and the $Fe_3O_4$ materials both adhere strictly to an $AB_2O_4$ spinel structure. The oxidation state of Mo in Mo ferrite was determined to be +6 by XPS (FIG. 2), and this was confirmed by X-ray absorption near-edge spectroscopy (XANES), a specific form of XAS. The oxidation state of Fe was also approximated by XANES, and for the materials discussed herein, we calculate Mo-ferrite and $Fe_{3-x}O_4$ to have oxidation states of 2.96 and 2.82 respectively. To write molecular formulae with an $AB_2O_4$ composition, the inclusion of cation vacancies are necessary to preserve charge balance between the cationic and anionic species and mass balance (i.e., maintain the ratio of three cation sites per four anion sites). Substituting higher valent cations leads to higher vacancy concentrations (Table 1).

Example 3

Electrochemical Charge Storage Studies

The Mo-ferrite and $Fe_{3-x}O_4$ nanoparticles discussed above served as active electrode materials for $Li^+$ and $Mg^{2+}$ insertion/extraction experiments. The oxide under investigation was mixed with acetylene black (Alfa Aesar) and Kynar® HSV 900 polyvinylidene fluoride (PVDF) resin in an 84:10:6 weight ratio using N-methyl-2-pyrrolidone (Aldrich) solvent. The resulting paste was coated onto aluminum (Strem) flags and dried overnight at 50° C. under a stream of flowing $N_2$ gas. The following day, the coated substrates were heated to 100° C. or 150° C. in vacuo for three hours to solidify the composite and ensure the removal of adsorbed water. Finished composite electrodes were characterized by cyclic voltammetry and galvanostatic charge-discharge measurements in a glovebox filled with high purity Ar. Using a conventional three-electrode half-cell arrangement, the composite electrode was immersed in a 1 M $LiClO_4$/propylene carbonate solution with two strips of Li ribbon acting as the reference and auxiliary electrodes for $Li^+$ charge-storage studies. Prior to cyclic voltammetry measurements, the working electrode was preconditioned at 4.1 V vs Li for 10 minutes; immediately afterwards the potential was scanned to 3.0 V, 2.5 V, or 2.0 V (vs. Li) at 500 µV s$^{-1}$ as indicated. Galvanostatic charge-discharge cycles were conducted between 4.1 V and 2.0 V (vs Li) using an applied current of 10 mA g$^{-1}$. (Note the current is normalized to the mass of metal oxide present). For the $Mg^{2+}$ charge storage studies, the composite electrode was immersed in 1 M $Mg(ClO_4)_2$/propylene carbonate with Ag wire acting as a reference electrode and steel acting as an auxiliary electrode. Galvanostatic discharge cycles using the Mo-ferrite composite electrode were conducted between 2.55 V and 0.15 V vs Mg using an applied current of 20 mA g$^{-1}$. (Again, the current is normalized to the mass of metal oxide present).

Figure 6:
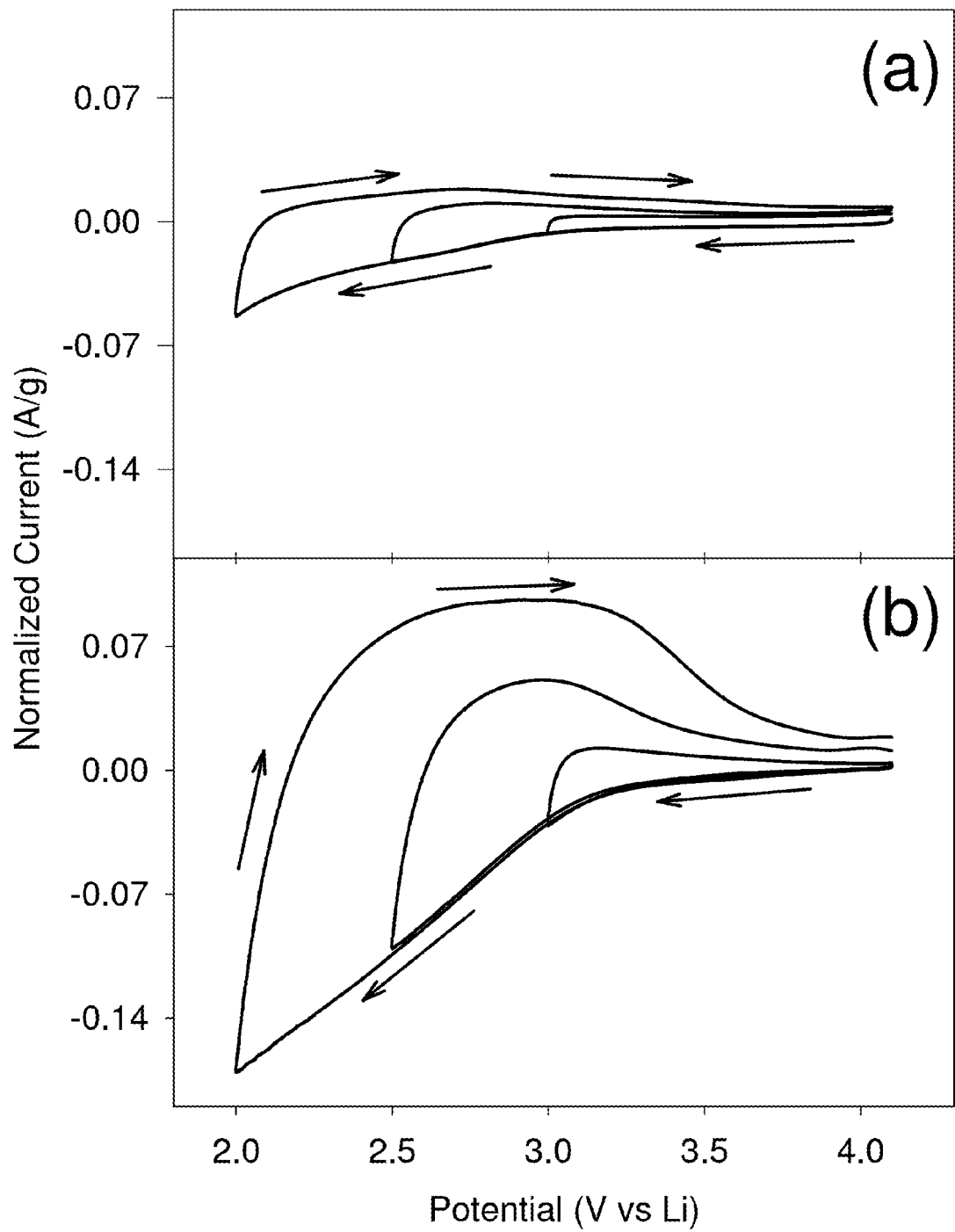
FIG. 6 shows cyclic voltammograms of (a) $Fe_{3-x}O_4$ and (b) Mo-ferrite composite electrodes immersed in 1 M $LiClO_4$/propylene carbonate. Electrodes were poised at 4.1 V vs Li for 10 min and then scanned at 500 µV s$^{-1}$ to 3.0 V, 2.5 V, and 2.0 V vs Li as shown. Current is normalized to the metal oxide mass.
Figure 7:
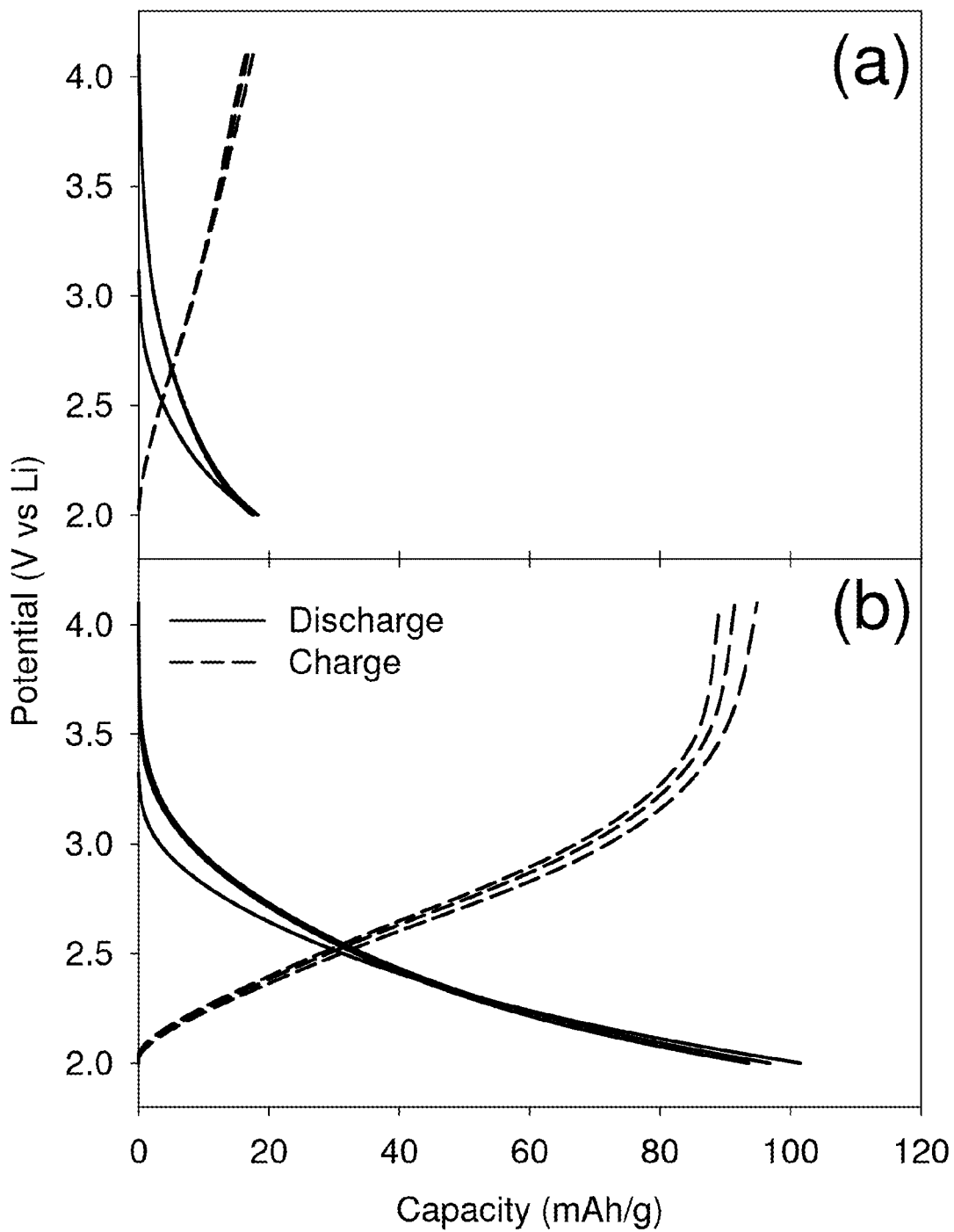
FIG. 7 shows galvanostatic charge-discharge curves of (a) $Fe_{3-x}O_4$ and (b) Mo-ferrite composite electrodes immersed in 1 M $LiClO_4$/propylene carbonate. Cycles 1-3 are shown. The applied current was 10 mA g$^{-1}$.
Figure 8:
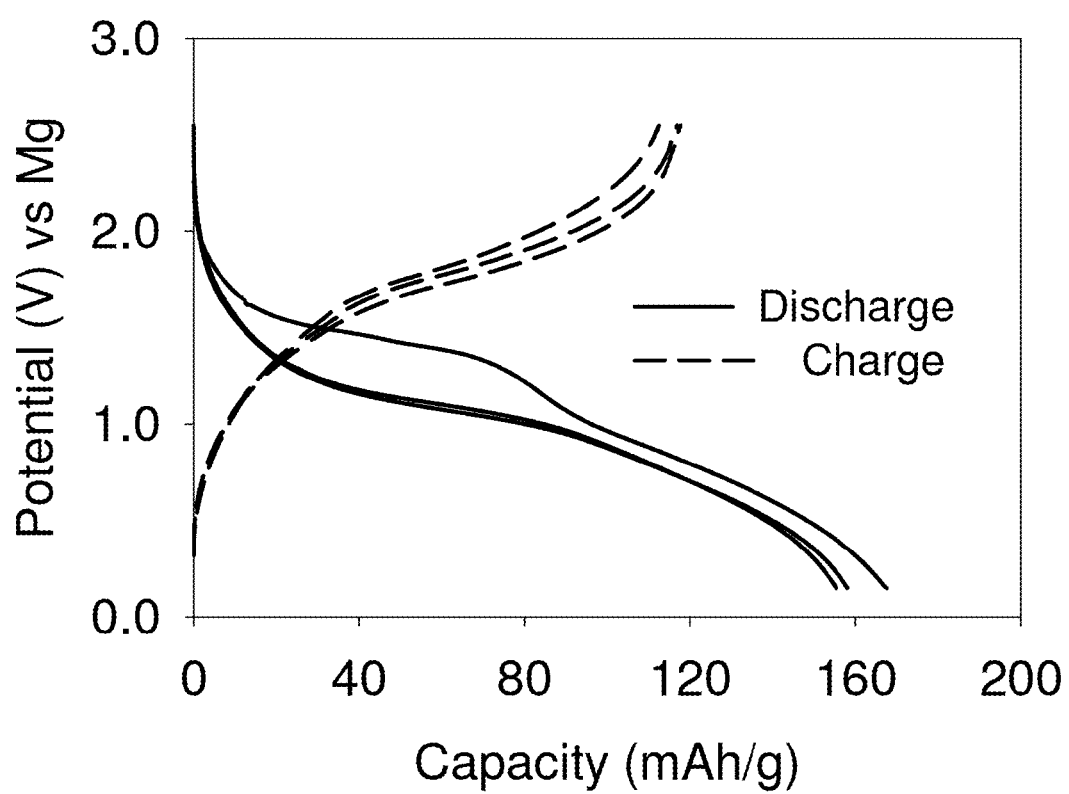
FIG. 8 shows galvanostatic charge-discharge curves of a Mo-ferrite composite electrode immersed in 1 M Mg$(ClO_4)_2$/propylene carbonate. Cycles 1-3 are shown. The applied current was 20 mA g$^{-1}$.

FIG. 6 compares cyclic voltammograms of $Fe_{3-x}O_4$ composite electrodes to Mo-ferrite composite electrodes immersed in 1 M $LiClO_4$/propylene carbonate, and as the data clearly show, the magnitude of the normalized current is significantly larger for voltammograms acquired using the Mo-ferrite composite electrode. The $Li^+$ charge-storage capacity was determined directly from galvanostatic charge-discharge curves. From the data in FIG. 7, Mo-ferrite achieves $Li^+$ capacities 4-5 times that of $Fe_{3-x}O_4$ over a moderate potential window (4.1-2.0 V vs Li). Moreover, the Coulombic efficiency of Mo-ferrite is >94% for all three cycles suggesting that structural degradation is gradual and the cation-deficient ferrite reversibly intercalates $Li^+$ over many cycles. Mo-ferrite can also intercalate $Mg^{2+}$ (FIG. 8) with decent reversibility over the first three cycles.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A composition comprising:
   an oxide comprising ions of a first metal and ions of a second metal;
   wherein the second metal ions have a higher oxidation state than the first metal ions;
   wherein the presence of the second metal ion increases the number of metal cation vacancies relative to an absence of the second metal ion; and
   wherein the oxide is proton stabilized.

2. The composition of claim 1;
   wherein the first metal ion is $Fe^{3+}$; and
   wherein the second metal ion is $Mo^{6+}$ or $V^{5+}$.

3. The composition of claim 1, wherein the oxide comprises $\gamma$-$Fe_2O_3$ and at least one metal ion selected from $Mo^{6+}$ and $V^{5+}$.

* * * * *